United States Patent
Ogawa et al.

(10) Patent No.: US 10,268,178 B2
(45) Date of Patent: Apr. 23, 2019

(54) NUMERICAL CONTROL DEVICE HAVING TOOL CORRECTION FUNCTION IN SKIVING PROCESSING

(71) Applicant: FANUC Corporation, Minamitsuru-gun, Yamanashi (JP)

(72) Inventors: Shuji Ogawa, Minamitsuru-gun (JP); Motohiko Ito, Minamitsuru-gun (JP); Masaru Kuroiwa, Minamitsuru-gun (JP)

(73) Assignee: FANUC Corporation, Minamitsuru-gun, Yamanishi (JP)

( * ) Notice: Subject to any disclaimer, the term of this patent is extended or adjusted under 35 U.S.C. 154(b) by 264 days.

(21) Appl. No.: 15/041,231

(22) Filed: Feb. 11, 2016

(65) Prior Publication Data

US 2016/0246288 A1    Aug. 25, 2016

(30) Foreign Application Priority Data

Feb. 24, 2015 (JP) ................. 2015-033656

(51) Int. Cl.
  *G05B 19/4103* (2006.01)
  *G05B 19/404* (2006.01)

(52) U.S. Cl.
  CPC .. *G05B 19/404* (2013.01); *G05B 2219/36504* (2013.01); *G05B 2219/45136* (2013.01); *G05B 2219/49233* (2013.01); *G05B 2219/50353* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 4,533,286 A | * | 8/1985 | Kishi | G05B 19/41 318/572 |
| 4,533,386 A | * | 8/1985 | Kibby | C22B 21/02 75/10.27 |
| 5,513,113 A | | 4/1996 | Okada et al. | |
| 2003/0089204 A1 | | 5/2003 | Schreiber et al. | |
| 2007/0245531 A1 | | 10/2007 | Kummer | |

(Continued)

FOREIGN PATENT DOCUMENTS

| | | |
|---|---|---|
| DE | 102009042149 A1 | 3/2011 |
| JP | S59-175944 A | 10/1984 |

(Continued)

OTHER PUBLICATIONS

Notification of Reasons for Refusal dated Apr. 4, 2017 in Japanese Patent Application No. 2015-033656 (4 pages) with an English translation (4 pages).

*Primary Examiner* — Robert G Bachner
(74) *Attorney, Agent, or Firm* — Drinker Biddle & Reath LLP

(57) ABSTRACT

Command data indicating a command path of a tool is generated on the basis of tool data created on the basis of an inclination and a shape of the tool, and interpolation data for each interpolation period is generated and outputted. When a command block is a block commanding skiving processing, correction data for correcting the command path is generated on the basis of the tool data stored in the tool data storage unit, and the correction data corresponding to interpolation data outputted by an interpolation unit is outputted.

8 Claims, 11 Drawing Sheets

(56) References Cited

U.S. PATENT DOCUMENTS

2014/0156052 A1\* 6/2014 Nishibashi ......... G05B 19/4103
  700/112
2015/0012127 A1\* 1/2015 Murakami ......... G05B 19/4083
  700/189

FOREIGN PATENT DOCUMENTS

| JP | H07-186006 A | 7/1995 |
| JP | H07-237086 A | 9/1995 |
| JP | H02-007105 A | 1/1999 |
| JP | 3984052 B2 | 9/2007 |
| JP | 2011-045988 A | 3/2011 |
| JP | 2013-244582 A | 12/2013 |
| WO | WO-01/43902 A2 | 6/2001 |
| WO | WO-2013/179850 A1 | 12/2013 |

\* cited by examiner

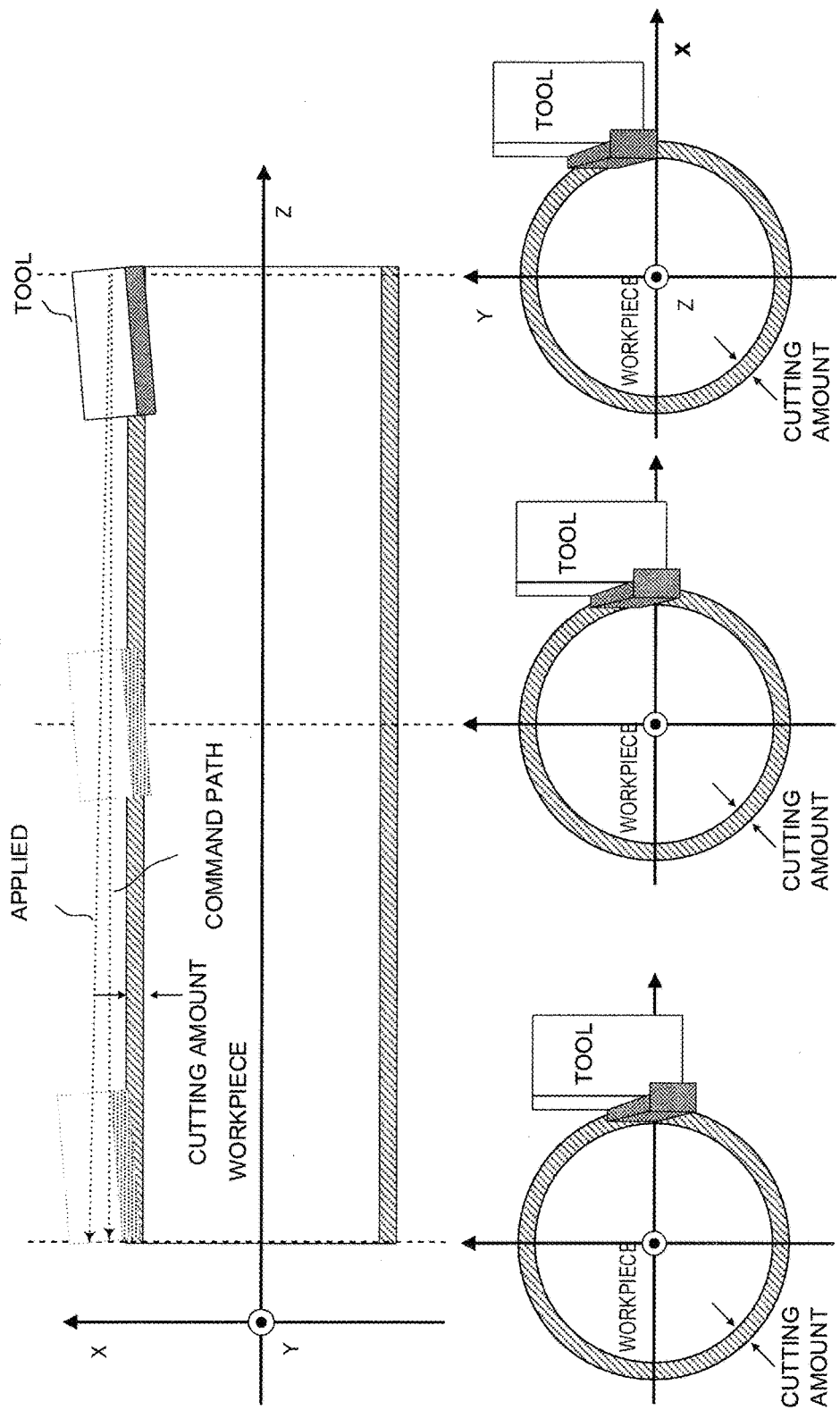

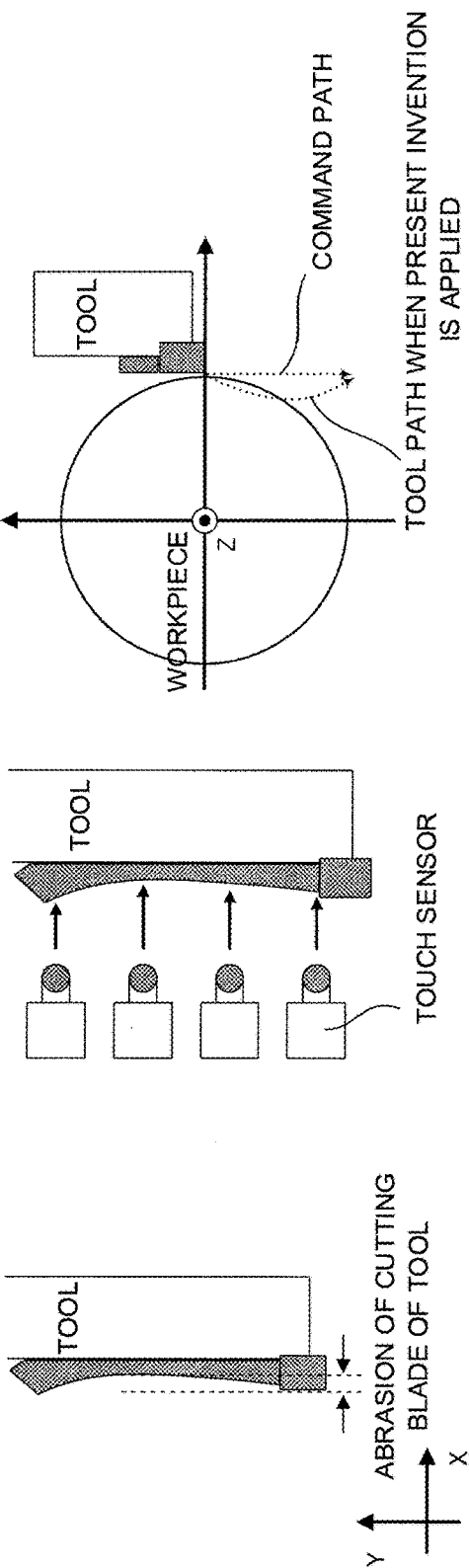

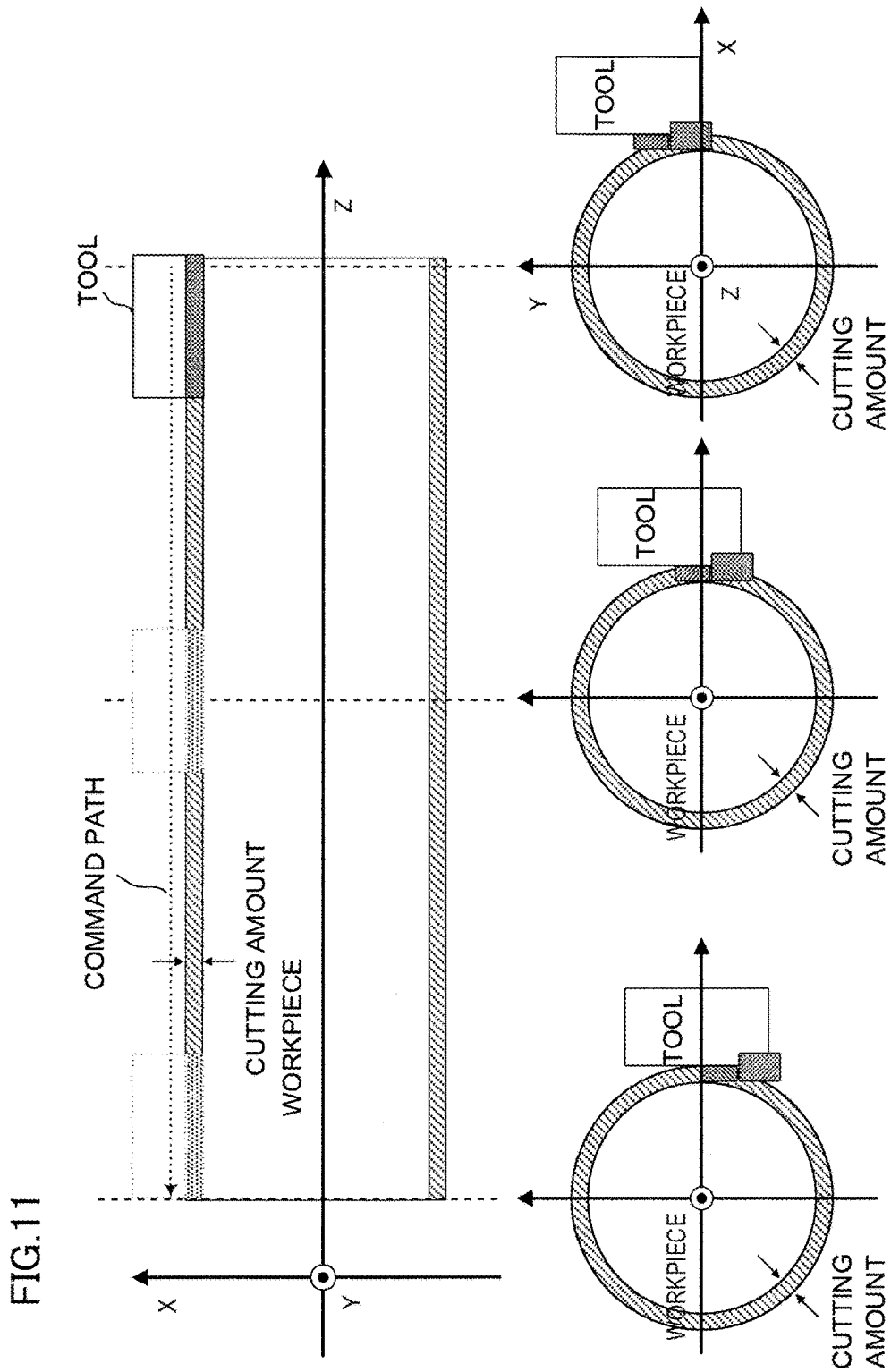

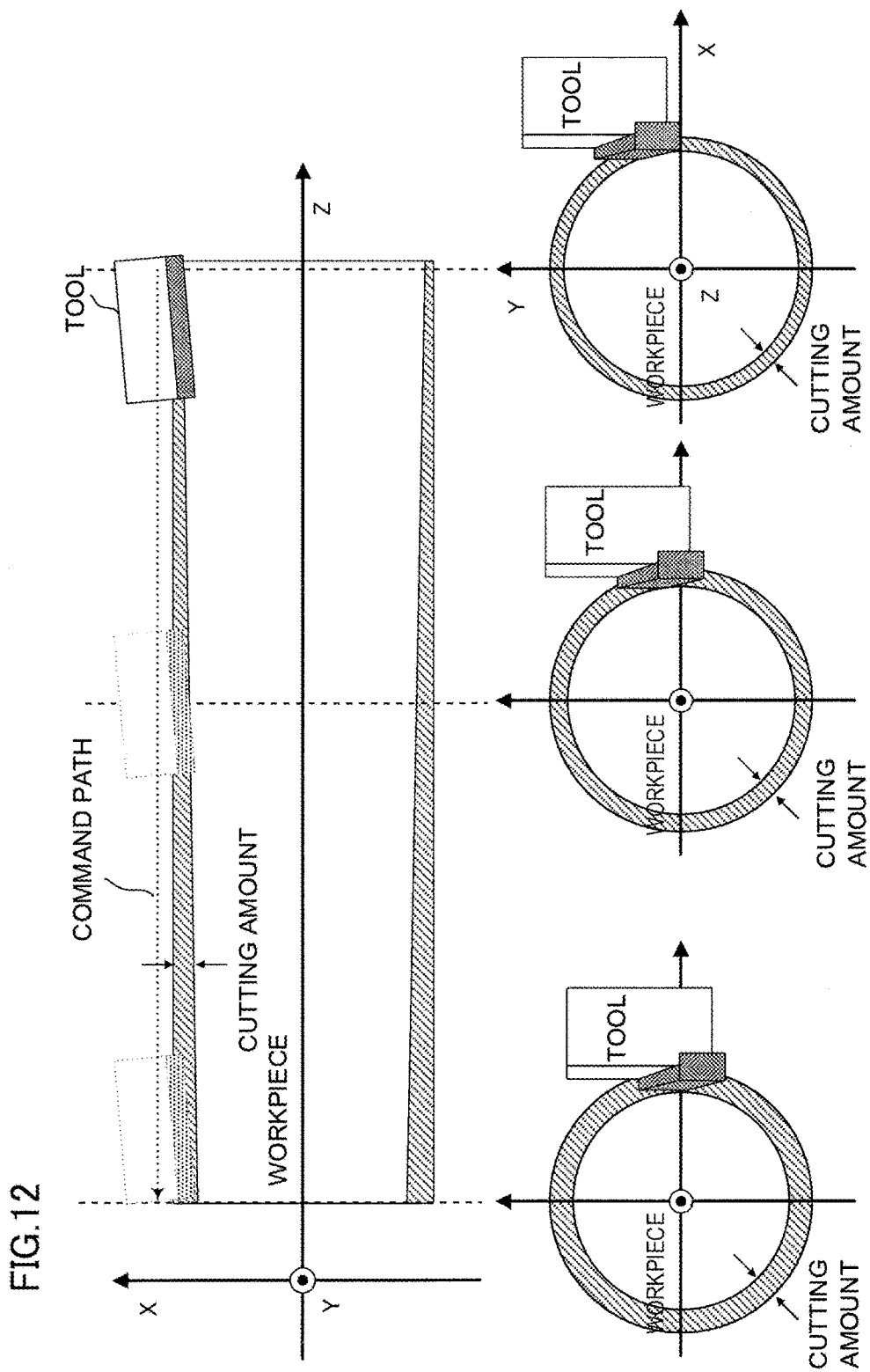

NUMERICAL CONTROL DEVICE HAVING TOOL CORRECTION FUNCTION IN SKIVING PROCESSING

RELATED APPLICATION DATA

This application claims priority under 35 U.S.C. § 119 and/or § 365 to Japanese Application No. 2015-033656 filed Feb. 24, 2015, the entire contents is incorporated herein by reference.

BACKGROUND OF THE INVENTION

1. Field of the Invention

The present invention relates to a numerical control device, and in particular, relates to a numerical control device having a tool correction function in skiving processing.

2. Description of the Related Art

In skiving processing with a turning machine, the processing is performed with the Z-axis and the Y-axis being moved using a tool having a straight blade which is disposed obliquely with respect to the rotational axis line of a workpiece in the YZ-plane (see Japanese Patent No. 3984052).

In the case of a tool illustrated in FIG. 10A, the straight blade of the tool is needed to be attached parallel to the rotational axis line (Z-axis line) in the ZX-plane as in FIG. 10B in order to perform processing precisely into a desired shape in this processing. If the tool is not attached parallel thereto as in FIG. 10C, the diameter of the processed article is not constant between the cutting start position and the cutting end position. In such a case, the processed article is needed to be measured once after the cutting, and based on the result, the processing program is needed to be modified, which lays a burden on an operator.

When the straight blade of the tool is parallel to the rotational axis line (Z-axis line) in the ZX-plane, as illustrated in FIG. 11, the cutting amount is constant regardless of the position of the tool even in turning with the Z-axis and the Y-axis being moved.

On the contrary, a case will be considered where the straight blade of the tool is not parallel to the rotational axis line (Z-axis line) in the ZX-plane as illustrated in FIG. 12. When the straight blade of the tool inclines toward the rotational axis line side with respect to the progress direction, the cutting amount is increased and the cutting load is increased as the tool is moving, which causes precision in the processing surface to suffer dispersion. Moreover, the diameter of the processed article varies between the start position and the end position of cutting.

SUMMARY OF THE INVENTION

Therefore, an object of the present invention is to provide a numerical control device capable of controlling a cutting path such that a cutting-in amount is constant even when a tool inclines in the vertical direction (X-axis direction) with respect to the rotational axis of a workpiece.

A numerical control device according to the present invention controls a machine tool which performs skiving processing of cutting processing on a rotational symmetry surface of a rotating workpiece with a tool, on the basis of a processing program including a command block, and includes: a tool data storage unit that stores tool data created on the basis of at least one of an inclination of the tool and a shape of the tool; a processing program analysis unit that reads out and analyzes a command block from the processing program, and generates and outputs command data indicating a command path of the tool which is commanded by the command block; an interpolation unit that performs interpolation processing on the basis of the command data, and generates and outputs interpolation data for each interpolation period of the interpolation processing; and a correction unit that generates correction data for correcting the command path on the basis of the tool data stored in the tool data storage unit, and outputs the correction data corresponding to the interpolation data outputted by the interpolation unit, when the command block is a block commanding the skiving processing.

A tool data creation unit that generates the tool data on the basis of output of a sensor that measures the inclination of the tool or the shape of the tool, and stores the tool data in the tool data storage unit may be further included.

The tool data may include a coordination value at a cutting start point on a blade edge of the tool and a coordination value at at least one point, on the blade edge, which is different from the cutting start point, and the correction unit may generate the correction data on the basis of a difference between the coordination value at the cutting start point on the blade edge of the tool and the coordination value at the point, on the blade edge, which is different from the cutting start point.

The correction unit may calculate a correction amount for correcting a position of a cutting point at which the workpiece perpendicularly comes into contact with the blade edge of the tool on the basis of the inclination, of the blade edge of the tool, which is calculated on the basis of the tool data, and may output the correction data that is generated on the basis of the correction amount, in accordance with the interpolation data outputted by the interpolation unit.

According to the present invention, even when a tool inclines, a numerical control device moves the X-axis such that a cutting amount is constant on the basis of an attachment angle of the tool. Modification of a processing program by an operator is not needed, so that the operator can create the processing program without being concerned about the attachment angle of the tool. Moreover, test processing for confirming the influence of the attachment angle of the tool is not needed, so that a process for causing the cutting amount from the processing start position to the processing end position to be constant can be reduced.

BRIEF DESCRIPTION OF THE DRAWINGS

The aforementioned and other objects and features of the present invention will be apparent from the following description of embodiments with reference to the appended drawings in which:

FIG. 2B is a diagram for explaining a concept of correction of the tool command path on the basis of the inclination of the blade edge of the tool in skiving processing of the present invention, and illustrates correction in which the tool is moved in the X-axis direction with respect to the original command path in accordance with movement of the tool in processing;

FIG. 3A is a diagram for explaining a concept of correction of the tool command path on the basis of a shape of the blade edge of the tool in skiving processing of the present invention, and illustrates a case where the cutting blade of the tool has a non-linear shape due to abrasion;

FIG. 3B is a diagram for explaining a concept of correction of the tool command path on the basis of the shape of the blade edge of the tool in skiving processing of the present invention, and illustrates an example in which a plurality of measurement points with touch sensors are provided;

FIG. 3C is a diagram for explaining a concept of correction of the tool command path on the basis of the shape of the blade edge of the tool in skiving processing of the present invention, and illustrates an example in which the tool is moved in the X-axis direction along the tool command path that is corrected according to the shape of the cutting blade;

FIG. 11 is a diagram illustrating a cutting result in the case where the tool does not incline in skiving processing; and FIG. 12 is a diagram illustrating a cutting result in the case where the tool inclines in skiving processing.

DETAILED DESCRIPTION OF THE PREFERRED EMBODIMENTS

Hereafter, embodiments of the present invention are described along with the drawings.

Figure 1:
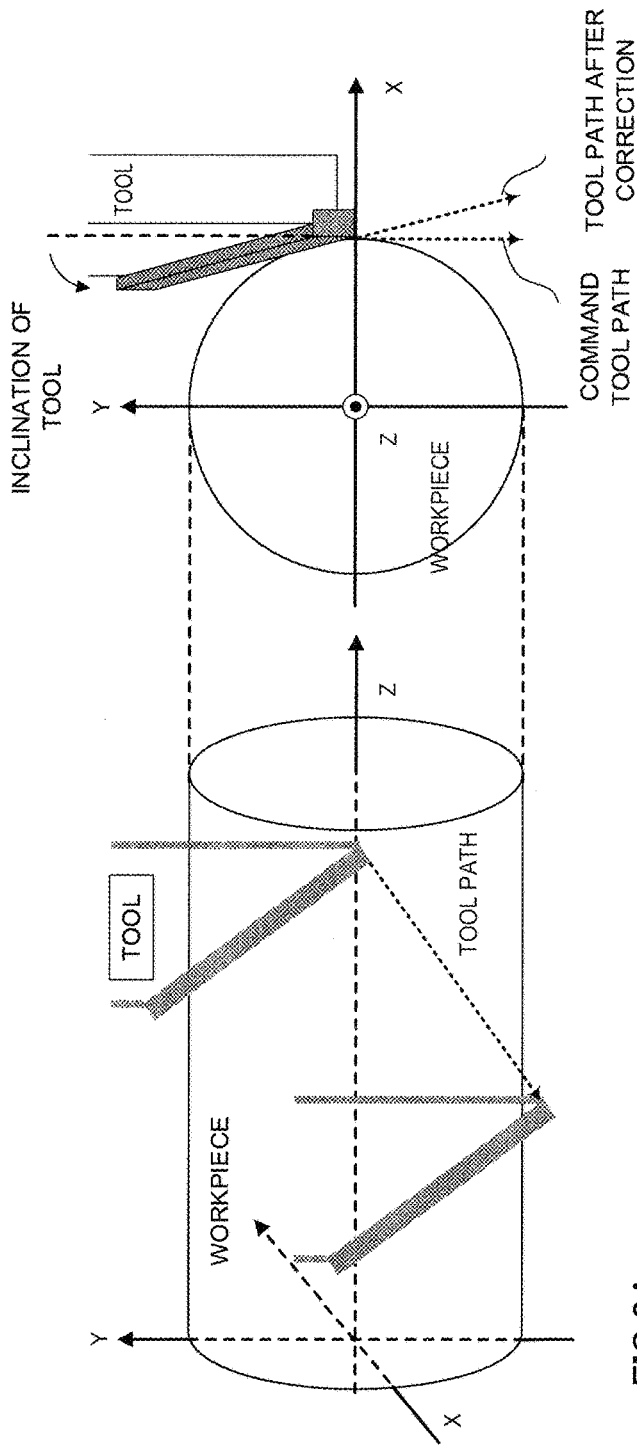
FIG. 1 is a diagram for explaining a concept of correction of a tool command path in skiving processing of the present invention.

In the present embodiment, there is provided a numerical control device that corrects a command path of a tool in the X-axis direction such that a cutting-in amount is constant, as illustrated in FIG. 1, when the cutting-in amount varies due to an inclination of the tool in the vertical direction (X-axis direction) with respect to the rotational axis of a workpiece in skiving processing with a turning machine.

Figure 2A:
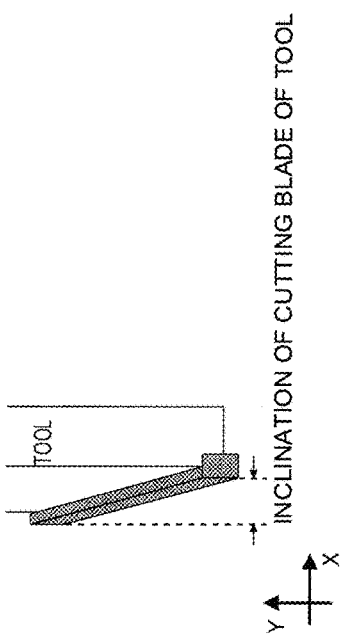
FIG. 2A is a diagram for explaining a concept of correction of the tool command path on the basis of an inclination of a blade edge of the tool in skiving processing of the present invention, and illustrates a case where a displacement arises between both edges of a cutting blade of the tool in the X-axis direction.

More specifically, the numerical control device of the present invention moves the tool in the X-axis direction in accordance with movement of the tool in processing on the basis of an attachment angle of a cutting blade of the tool (displacement between both ends of the cutting blade in the X-axis direction) obtained by measurement before processing with touch sensors or the like. Thus, the movement path of the tool is controlled such that a cutting amount is constant. Namely, when the displacement arises between both ends of the cutting blade of the tool in the X-axis direction as illustrated in FIG. 2A, a command path of the tool that is corrected to move the tool in the X-axis direction with respect to the original command path in accordance with movement of the tool in processing is generated on the basis of the displacement as illustrated in FIG. 2B.

Moreover, also when the cutting blade of the tool is in a non-linear shape due to abrasion as illustrated in FIG. 3A, a shape of the cutting blade is measured by providing a plurality of measurement points such as touch sensors as illustrated in FIG. 3B. Then, based on the measurement result, the tool can also be moved in the X-axis direction along the command path of the tool that is corrected to match the shape of the cutting blade as in FIG. 3C.

Embodiment 1

Figure 4:
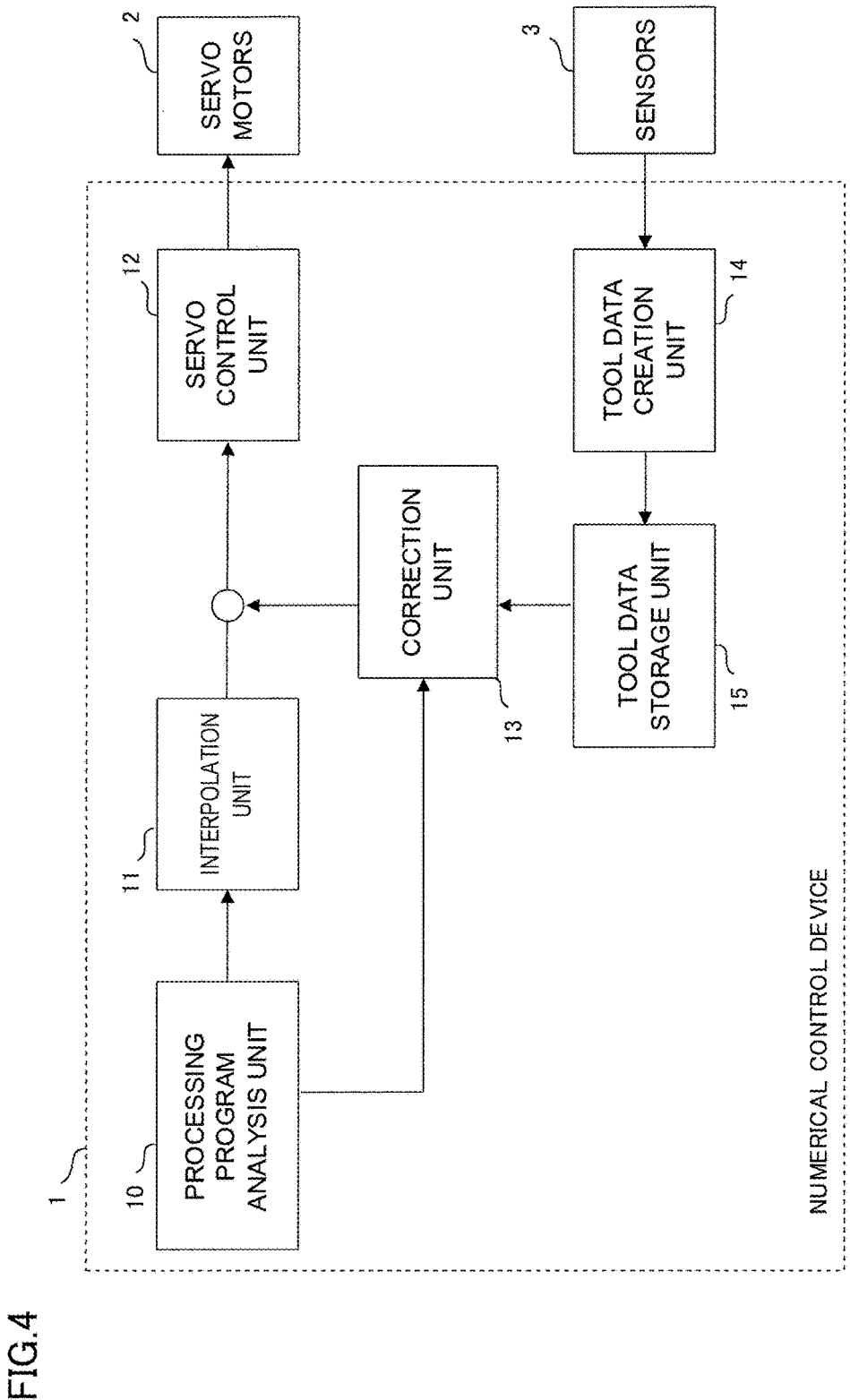
FIG. 4 is a functional block diagram of a numerical control device in Embodiment 1 of the present invention.

FIG. 4 is a functional block diagram of a numerical control device according to an embodiment of the present invention. A numerical control device 1 of the present invention includes a processing program analysis unit 10, an interpolation unit 11, a servo control unit 12, a correction unit 13, a tool data creation unit 14 and a tool data storage unit 15.

The processing program analysis unit 10 sequentially reads out command blocks of a processing program stored in a not-shown memory and analyzes the read-out command blocks. When the analysis result shows that a read-out block is a normal command, a command data is generated and outputted to the interpolation unit 11 on the basis of the analysis result in a typical manner. When the read-out block is a processing block of cutting feed in which a skiving tool is selected, the correction unit 13 is commanded to correct a command path based on the relevant command block.

Based on the command data outputted by the processing program analysis unit 10, the interpolation unit 11 generates and outputs interpolation data (command pulse) obtained by interpolation calculation of points on the command path for an interpolation period to the servo control unit 12.

Based on the interpolation data inputted from the interpolation unit 11, the servo control unit 12 drives servo motors 2 and relatively moves a workpiece and a tool.

The correction unit 13 acquires tool data from the tool data storage unit 15, and performs a correction process mentioned later on the basis of the tool data and the command from the processing program analysis unit 10 to generate a correction pulse. Then, the correction pulse is outputted to the servo control unit 12 along with the interpolation data outputted by the interpolation unit 11.

The tool data creation unit 14 is operated with tool exchange commands described in the processing program, and operation commands from an operation panel by an operator. It acquires an inclination and a shape of the tool attached to the turning machine from sensors 3 to create the tool data. The created tool data is stored in the tool data storage unit 15.

Hereafter, described is a flow from the analysis of the tool to the skiving processing by the numerical control device 1 having the configuration as above.

When a skiving tool is manually or automatically attached to the turning machine with a tool exchange command of the processing program or the like, the numerical control device 1 measures an inclination and a shape of the attached skiving tool in the X-axis direction manually or automatically using the sensors 3 such as touch sensors. Based on the measurement result, the tool data creation unit 14 creates the tool data and stores it in the tool data storage unit 15.

Figure 5B:
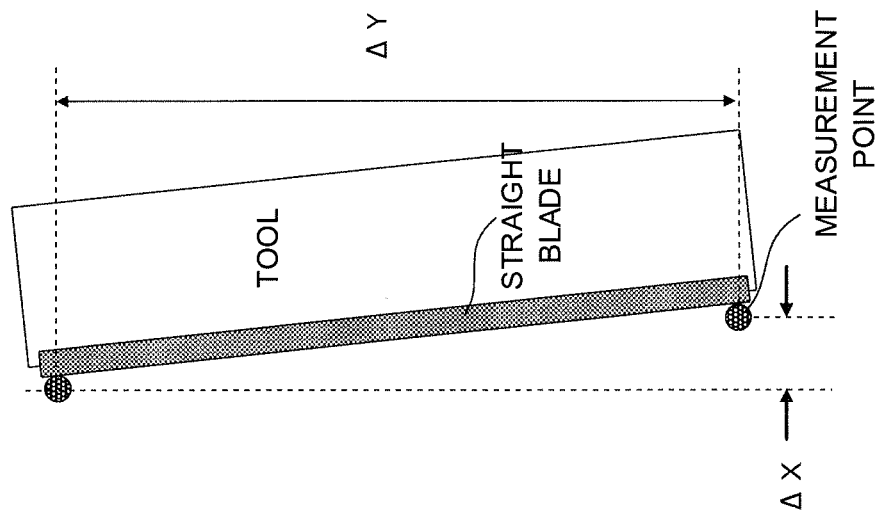
FIG. 5B is a diagram for explaining a creation method of the tool data based on the inclination of the blade edge of the tool of the present invention, and illustrates a case where ΔX is calculated from a difference between the measurement results of touch sensors.
Figure 5A:
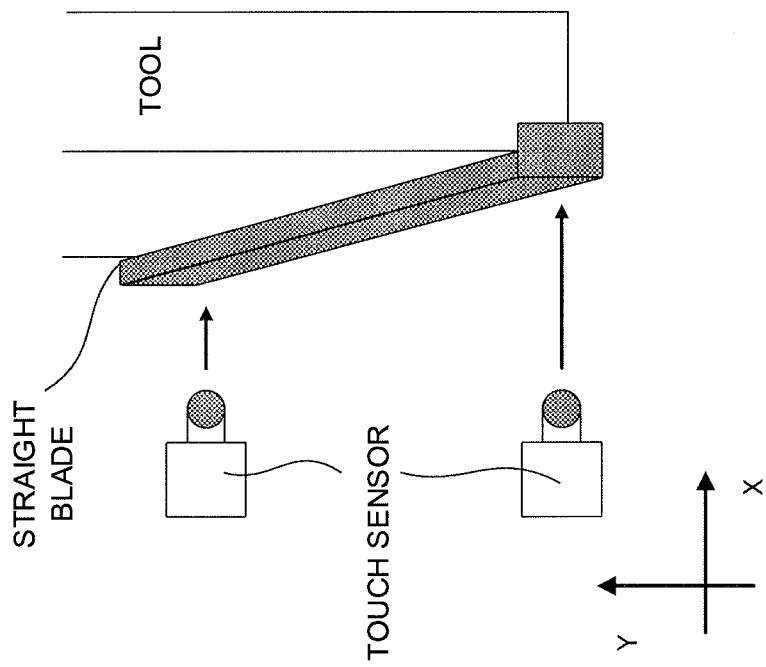
FIG. 5A is a diagram for explaining a creation method of tool data based on the inclination of the blade edge of the tool of the present invention, and illustrates a case where only the inclination of the tool is measured.

When only the inclination of the tool is measured in the occasion of creating the tool data, as in FIG. 5A, at least one touch sensor positioned at both end parts of the tool are used. Then, $\Delta X$ is calculated from the difference between the measurement result of the touch sensor positioned at a cutting start point and the measurement result of the other touch sensor. $\Delta X$ is stored in the tool data storage unit 15 along with a distance $\Delta Y$ between the sensors obtained from the arrangement of the sensors (which is preset or determined from the positions of the servo motors driving the sensors) as the tool data (FIG. 5B).

When the number of the measurement points on the straight blade of the tool is two and the displacement in X-axis component between the two points is $\Delta X$ as above, the correction unit 13 starts a movement of the X-axis from the cutting start point of the cutting block (position (Y-axis component) at which the workpiece comes into contact with the tool), and ends the movement of the X-axis after having passed through the cutting end point (position (Y-axis component) at which the workpiece has separated from the tool). Then, the correction pulse for maintaining the position at the end of the movement is outputted in accordance with the interpolation data. In this stage, the X-axis moves by $\Delta X$ at most. After the processing block is ended, the correction unit 13 cancels the correction pulse and returns the X-axis to the original position after the tool has been retracted or parallelly during the retracting movement of the tool.

Figure 6B:
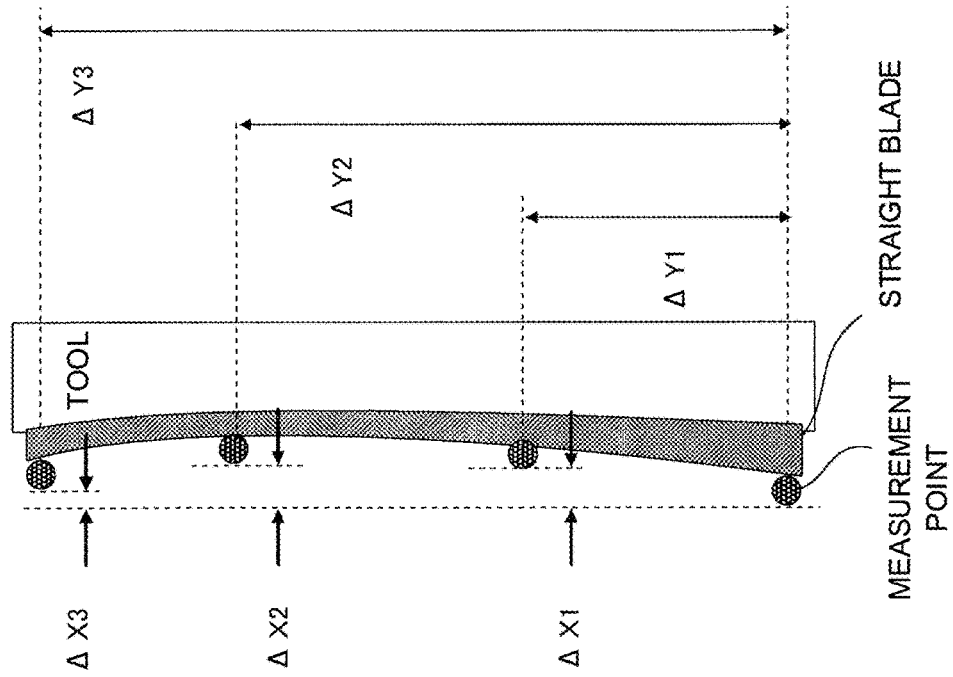
FIG. 6B is a diagram for explaining a creation method of the tool data based on the shape of the blade edge of the tool of the present invention, and illustrates relation between the measurement results of the touch sensors and distances from the touch sensors.
Figure 6A:
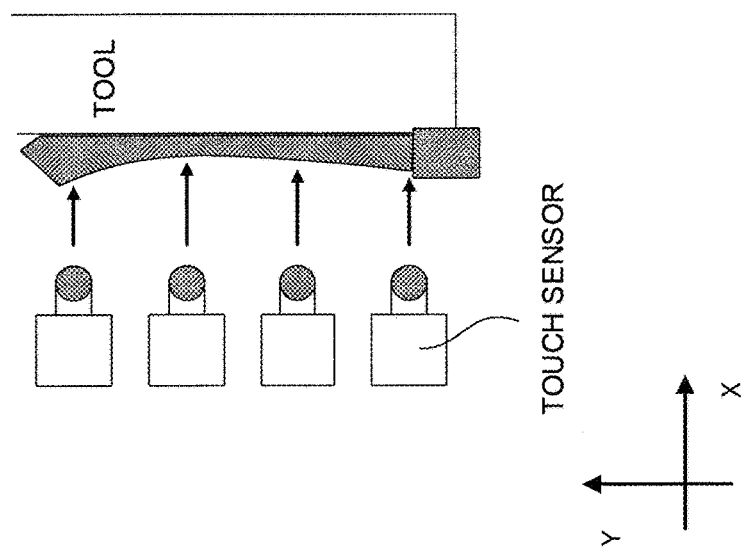
FIG. 6A is a diagram for explaining a creation method of the tool data based on the shape of the blade edge of the tool of the present invention, and illustrates a case where the shape of a straight blade of the tool is measured using a plurality of touch sensors.

Meanwhile, when the shape of the straight blade of the tool which is in a non-linear shape due to abrasion is measured in the occasion of creating the tool data, as illustrated in FIG. 6A, a plurality of touch sensors are used. Then, $\Delta X_1$, $\Delta X_2$, $\Delta X_3$, ... are calculated from the respective differences between the measurement result of the touch sensor positioned at the cutting start point and those of the other touch sensors. $\Delta X_1$, $\Delta X_2$, $\Delta X_3$, ... are stored in the tool data storage unit 15 along with the distances $\Delta Y_1$, $\Delta Y_2$, $\Delta Y_3$, ... which are from the touch sensor positioned on the cutting start point side and are obtained from the arrangement of the sensors (which is preset or determined from the positions of the servo motors driving the sensors) as the tool data (FIG. 6B).

Figure 7A:
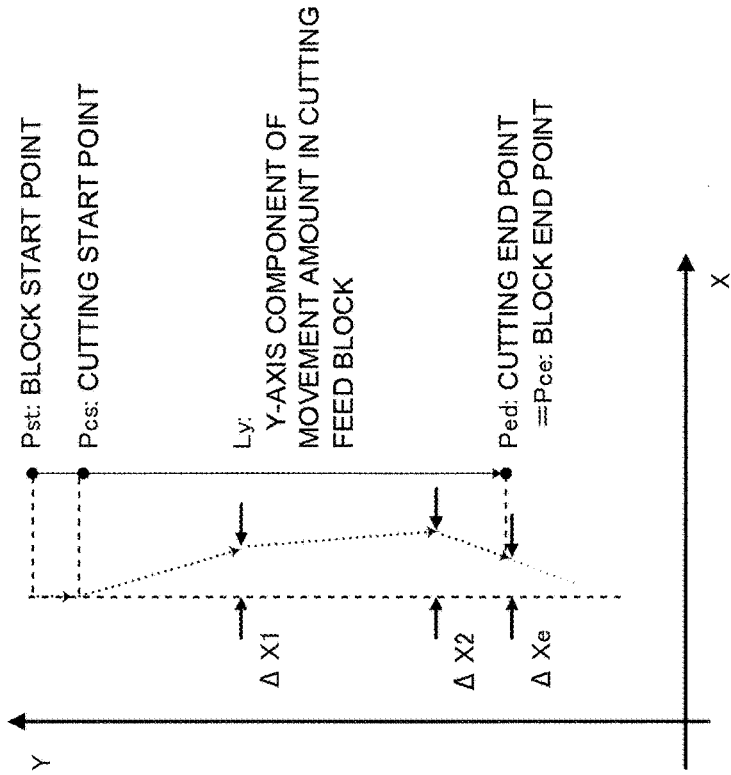
FIG. 7A is a diagram illustrating a specific example of correction of the tool command path on the basis of the shape of the blade edge of the tool of the present invention.
Figure 7B:
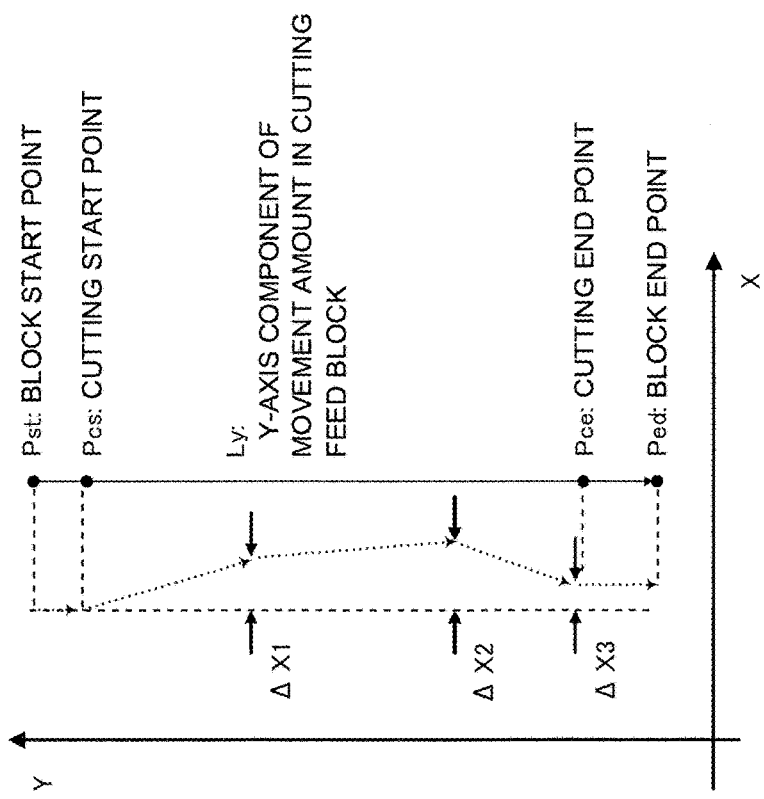
FIG. 7B is a diagram illustrating a specific example of correction of the tool command path on the basis of the shape of the blade edge of the tool of the present invention.

When the measurement points on the straight blade of the tool are plural as above and the displacements in X-axis component on the straight blade of the tool are $\Delta X_1$ at the distance $\Delta Y_1$ from the cutting start point, $\Delta X_2$ at the distance $\Delta Y_2$ therefrom, and $\Delta X_3$ at the distance $\Delta Y_3$ therefrom as in FIG. 6B, the correction unit 13 outputs the correction pulse for moving the X-axis as in FIGS. 7A and 7B with the Y-axis being moved, in accordance with the interpolation data, where the Y-axis component of the movement amount in the cutting feed block is Ly. Namely, the correction pulse is outputted such that the X-axis is moved by $\Delta X_1$ during the Y-axis moving from the cutting start point by $\Delta Y_1$, the X-axis is moved by $(\Delta X_2 - \Delta X_1)$ during the next movement of the Y-axis by $(\Delta Y_2 - \Delta Y_1)$, and the X-axis is moved by $(\Delta X_3 - \Delta X_2)$ during the next movement of the Y-axis by $(\Delta Y_3 - \Delta Y_2)$.

Notably, when the Y-axis component Ly of the movement amount in the cutting feed block is smaller than the Y-axis component length ($\Delta Y$ in FIG. 5B; $\Delta Y_3$ in FIG. 6B) between the measurement points at both ends, as illustrated in FIG. 7B, the movement amount of the X-axis is $\Delta X_e$. Moreover, when the block start point is the same as the cutting start point, a path in which the movement of the X-axis is started simultaneously to the start of the block is generated.

Figure 8:
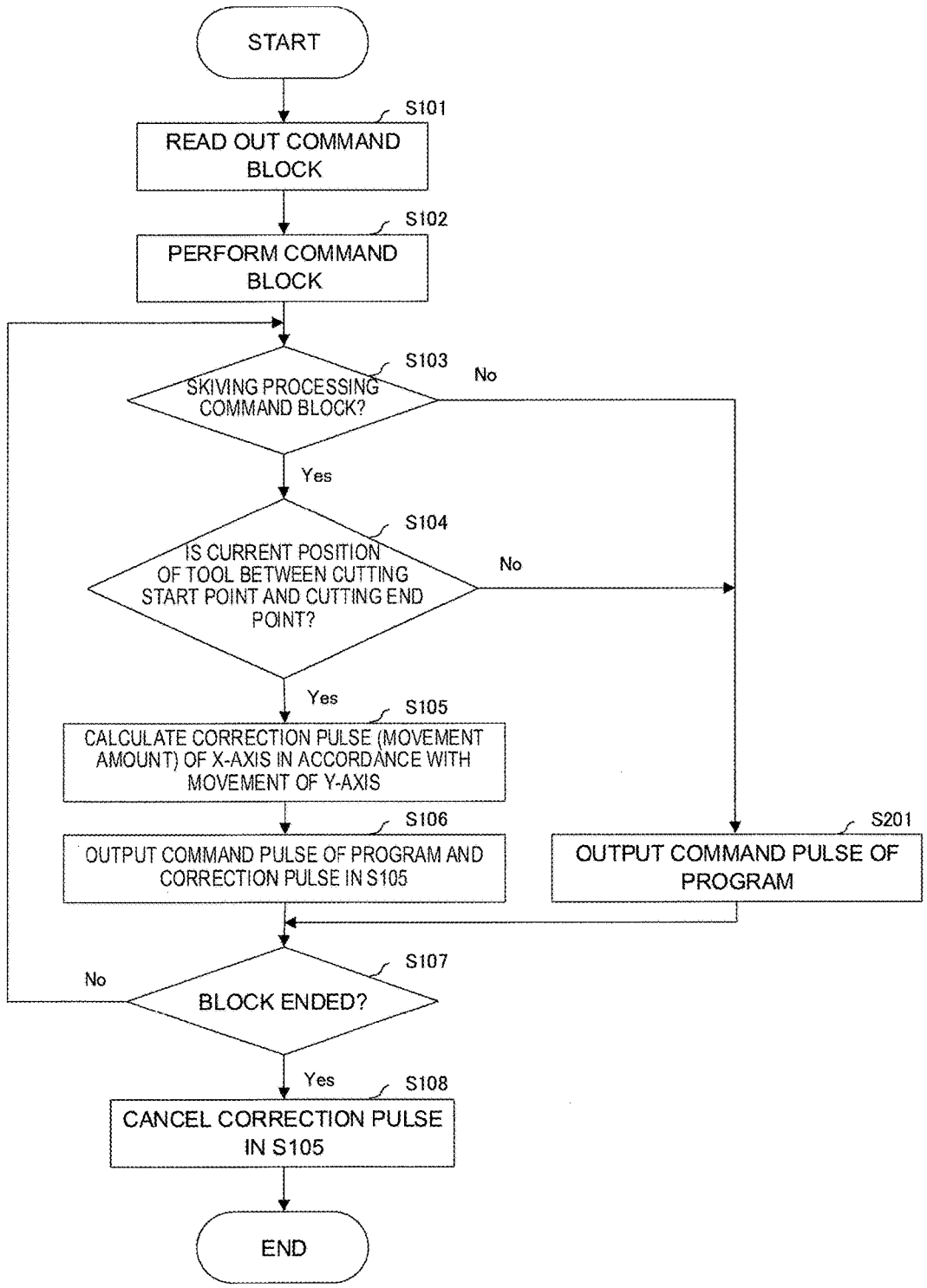
FIG. 8 is a flowchart of processes performed on the numerical control device in Embodiment 1 of the present invention.

FIG. 8 is a flowchart of processes performed on the numerical control device 1 of the present embodiment. The processes are performed for each block in the processing program.

[Step S101] The processing program analysis unit 10 reads out a command block from the processing program.

[Step S102] The processing program analysis unit 10 analyzes the command block read out in step S101 to generate command data, and starts to perform the command block according to the command data.

[Step S103] The processing program analysis unit 10 determines whether or not the currently performed command block is a skiving processing command block. In the case of being the skiving processing command block (YES), the process is put forward to step S104, and otherwise (NO), the process is put forward to step S201.

[Step S104] The correction unit 13 determines whether or not the current position of the tool is between the cutting start point and the cutting end point. In the case of being between the cutting start point and the cutting end point (YES), the process is put forward to step S105, and otherwise (NO), the process is put forward to step S201.

[Step S105] The correction unit 13 calculates a correction pulse (movement amount) of the X-axis which is in accordance with the movement of the Y-axis of the tool on the basis of the tool data stored in the tool data storage unit 15.

[Step S106] The interpolation unit 11 outputs the command pulse of the program. The correction unit 13 outputs the correction pulse calculated in step S105 in accordance with the interpolation unit 11 outputting the command pulse.

[Step S107] It is determined whether or not the performance of the command block is ended. In the case of being ended (YES), the process is put forward to step S108, and in the case of not being ended (NO), the process is returned to step S103.

[Step S108] The correction unit 13 cancels the correction pulse calculated in step S105 and returns the X-axis to the original position.

[Step S201] The interpolation unit 11 outputs the command pulse of the program.

Embodiment 2

Figure 9A:
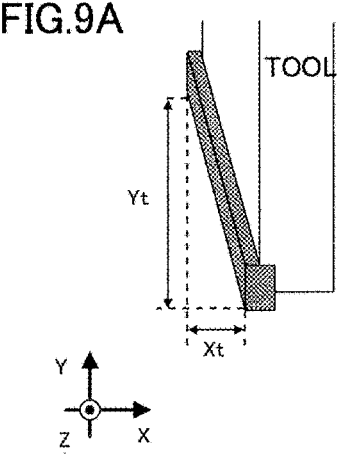
FIG. 9A is a diagram for explaining a correction method of a cutting point on the basis of the inclination of the blade edge of the tool in Embodiment 2 of the present invention.
Figure 9B:
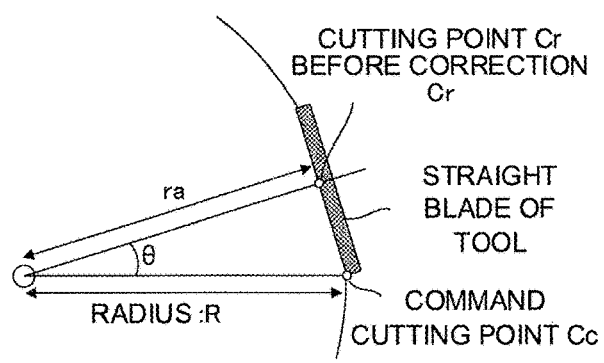
FIG. 9B is a diagram for explaining a correction method of the cutting point on the basis of the inclination of the blade edge of the tool in Embodiment 2 of the present invention.
Figure 9C:
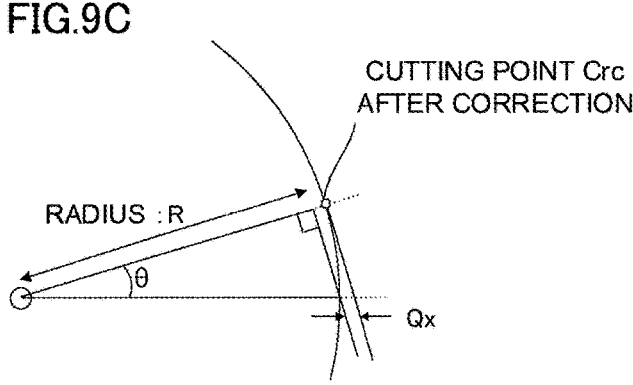
FIG. 9C is a diagram for explaining a correction method of the cutting point on the basis of the inclination of the blade edge of the tool in Embodiment 2 of the present invention.
Figure 10A:
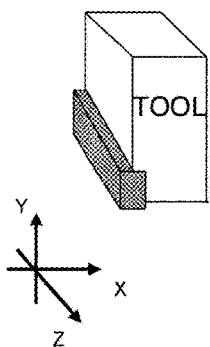
FIG. 10A is a diagram for explaining the inclination of the tool in skiving processing.
Figure 10B:
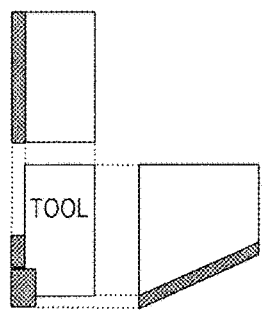
FIG. 10B is a diagram for explaining the inclination of the tool in skiving processing.
Figure 10C:
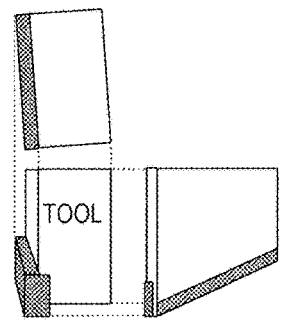
FIG. 10C is a diagram for explaining the inclination of the tool in skiving processing.

In the skiving processing, when the straight blade of the tool inclines in the X-axis direction as in FIG. 9A, since a cutting point (point at which the workpiece perpendicularly comes into contact with the tool) is a position Cr as illustrated in FIG. 9B, a workpiece radius commanded by the program cannot be achieved. Therefore, in the present embodiment, a procedure is presented in which, in such a case, the command path of the tool is corrected such that the cutting point becomes a cutting point Crc after correction in FIG. 9C.

As illustrated in FIG. 9A, the X-axis component of the inclination of the straight blade of the tool is set to be Xt, the Y-axis component thereof is to be Tt, and the degree thereof is to be θ. When the workpiece radius at a cutting point commanded by the processing program is set to be R, with expression 1 below, the radius of the workpiece after the processing becomes the radius R commanded by the processing program by moving the X-axis by a correction amount Qx.

Radius $ra$ to cutting point $Cr$: $ra = R \times \cos\theta$

Correction amount Qx:

$$Qx = R \times \frac{R}{ra} - R$$

$$= \frac{R}{\cos\theta} - R$$

1 Radius ra to cutting point Cr
2 Correction amount Qx

The numerical control device of the present embodiment has the same configuration as that of the numerical control device 1 of Embodiment 1, and when a tool for skiving processing is attached thereto, it measures the inclination of the tool using the sensors 3 and stores the tool data similarly to Embodiment 1. Then, when, in the processing block of cutting feed in which the skiving tool is selected, it is commanded that the workpiece radius be corrected automatically or with manual operation, the correction unit 13 calculates the correction amount Qx using expression 1 on the basis of the tool data stored in the tool data storage unit 15. A correction pulse is outputted corresponding to the calculated correction amount Qx, and thereby, the position of the cutting point is corrected so as to be the cutting point Crc after correction.

As above, the embodiments of the present invention have been described. The present invention is not limited to the aforementioned exemplary embodiments but can be implemented in various modes with proper modifications applied thereto.

For example, touch sensors are exemplary in the aforementioned embodiments as the sensors measuring the tool, which are not limited to them and may employ any ones which can measure the shape of the tool, such as distance sensors based on light or ultrasonic waves.

The invention claimed is:

1. A numerical control device controlling a machine tool which performs skiving processing of cutting processing on a rotational symmetry surface of a rotating workpiece with a tool, on the basis of a processing program including a command block, the device comprising:

a tool data storage unit that stores tool data created on the basis of at least one of an inclination of the tool and a shape of the tool;

a processing program analysis unit that reads out and analyzes a command block from the processing program, and generates and outputs command data indicating a command path of the tool which is commanded by the command block;

an interpolation unit that performs interpolation processing on the basis of the command data, and generates and outputs interpolation data for each interpolation period of the interpolation processing; and a correction unit that determines, when the command block is a block commanding the skiving processing, whether a current position of the tool is between a cutting start point and a cutting end point, and that generates, when the current position of the tool is between the cutting start point and the cutting end point and when the command block is the block commanding the skiving processing, correction data for correcting the command path for each interpolation period of the interpolation processing on the basis of the tool data stored in the tool data storage unit and the current position of the tool being between the cutting start point and the cutting end point, and outputs the correction data corresponding to the interpolation data outputted by the interpolation unit.

2. The numerical control device according to claim 1, further comprising a tool data creation unit that generates the tool data on the basis of output of a sensor that measures the inclination of the tool or the shape of the tool, and stores the tool data in the tool data storage unit.

3. The numerical control device according to claim 1, wherein the tool data includes a coordination value at the cutting start point on a blade edge of the tool and a coordination value at least one point, on the blade edge, which is different from the cutting start point, and the correction unit generates the correction data on the basis of a difference between the coordination value at the cutting start point on the blade edge of the tool and the coordination value at the point, on the blade edge, which is different from the cutting start point.

4. The numerical control device according to claim 1, wherein the correction unit calculates a correction amount for correcting a position of a cutting point at which the workpiece perpendicularly comes into contact with the blade edge of the tool on the basis of the inclination of the blade edge of the tool, which is calculated on the basis of the tool data, and outputs the correction data that is generated on the basis of the correction amount, in accordance with the interpolation data outputted by the interpolation unit.

5. The numerical control device according to claim 2, wherein the tool data includes a coordination value at the cutting start point on a blade edge of the tool and a coordination value at least one point, on the blade edge, which is different from the cutting start point, and the correction unit generates the correction data on the basis of a difference between the coordination value at the cutting start point on the blade edge of the tool and the coordination value at the point, on the blade edge, which is different from the cutting start point.

6. The numerical control device according to claim 2, wherein the correction unit calculates a correction amount for correcting a position of a cutting point at which the workpiece perpendicularly comes into contact with the blade edge of the tool on the basis of the inclination of the blade edge of the tool, which is calculated on the basis of the tool data, and outputs the correction data that is generated on the basis of the correction amount, in accordance with the interpolation data outputted by the interpolation unit.

7. The numerical control device according to claim 3, wherein the correction unit calculates a correction amount for correcting a position of a cutting point at which the workpiece perpendicularly comes into contact with the blade edge of the tool on the basis of the inclination of the blade edge of the tool, which is calculated on the basis of the tool data, and outputs the correction data that is generated on the basis of the correction amount, in accordance with the interpolation data outputted by the interpolation unit.

8. The numerical control device according to claim 5, wherein the correction unit calculates a correction amount for correcting a position of a cutting point at which the workpiece perpendicularly comes into contact with the blade edge of the tool on the basis of the inclination of the blade edge of the tool, which is calculated on the basis of the tool data, and outputs the correction data that is generated on the basis of the correction amount, in accordance with the interpolation data outputted by the interpolation unit.

* * * * *